Nov. 7, 1939.  D. P. WHEELER  2,179,109
CARRIER AND DISPLAY DEVICE
Filed Oct. 31, 1938  3 Sheets-Sheet 1

Inventor
Donald Payne Wheeler
By Brown, Jackson, Boettcher & Dienner
Attys.

Nov. 7, 1939.　　　　　D. P. WHEELER　　　　　2,179,109
CARRIER AND DISPLAY DEVICE
Filed Oct. 31, 1938　　　　3 Sheets-Sheet 2
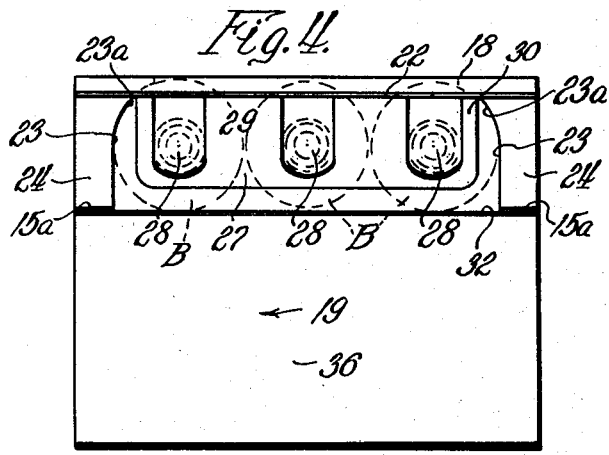
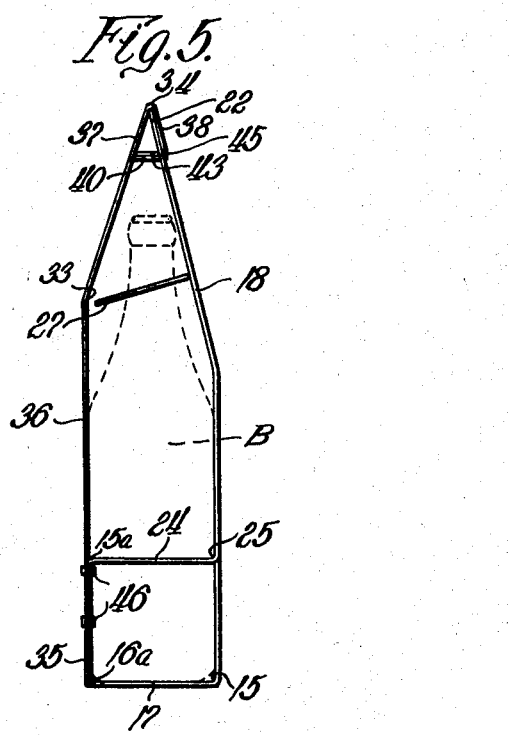
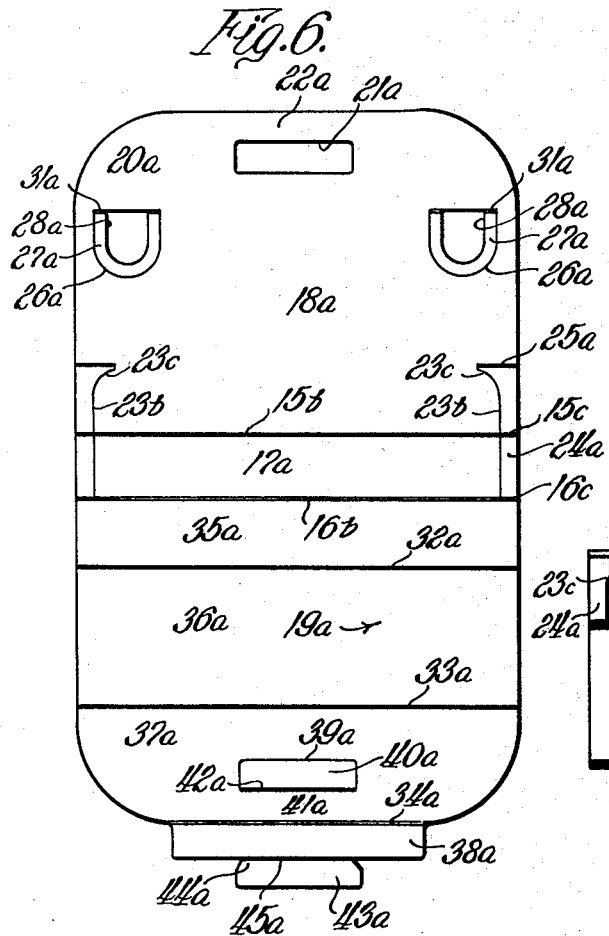
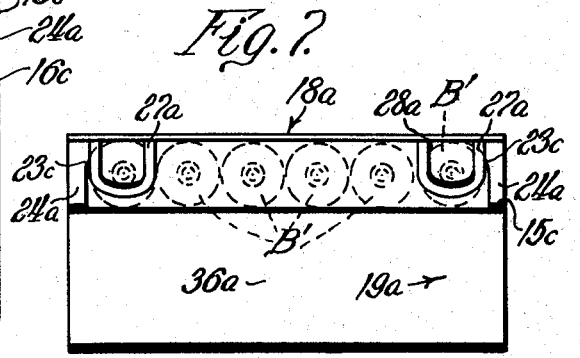
Inventor
Donald Payne Wheeler
By Brown, Jackson, Boettcher & Dienner
Attys.

Nov. 7, 1939.  D. P. WHEELER  2,179,109
CARRIER AND DISPLAY DEVICE
Filed Oct. 31, 1938  3 Sheets—Sheet 3

Inventor
Donald Payne Wheeler
By Brown, Jackson, Cuttell & Dienner
Attys.

Patented Nov. 7, 1939

2,179,109

UNITED STATES PATENT OFFICE 2,179,109

CARRIER AND DISPLAY DEVICE

Donald Payne Wheeler, Elkhart, Ind., assignor to American Coating Mills, Inc., Elkhart, Ind., a corporation of Indiana Application October 31, 1938, Serial No. 237,817

11 Claims. (Cl. 229—52)

This invention relates to carriers, and has to do with carriers for transporting bottles and like containers.

My invention is directed to the provision of a carrier of the character stated particularly suitable for display purposes when not in use as a carrier, which may be shipped flat and set up for use with expedition and facility, possesses adequate mechanical strength, is provided with a display panel disposable at a downward and outward inclination such that the advertising matter thereon is displayed to best advantage when the carrier is used for display purposes, and which is provided with a handle structure of exceptional mechanical strength and of suitable size and shape to provide an adequate hand hold. Further objects and advantages will appear from the detailed description.

In the drawings:

Figure 4 is a plan view of the carrier as set up in Figures 2 and 3;

Figure 5 is an end view of the carrier as set up for carrying purposes;

Figure 6 is a plan view of a blank for forming a modified form of carrier embodying my invention;

Figure 7 is a plan view of a carrier produced from the blank of Figure 6, as set up for display purposes;

Figure 12:
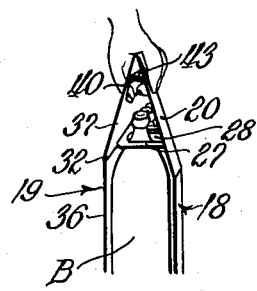
Figure 13:
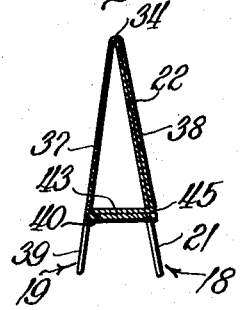

Figures 8 to 12, inclusive, are views illustrating the successive steps of positioning and locking together the carrying flaps and associated elements of the carrier of Figures 1 to 5, inclusive; and Fig. 13 is a vertical sectional view through the handle structure of the carrier.

In describing the blank and the carrier formed therefrom, the relative positions of the different elements will be stated with reference to their relations in the carrier, when the latter is set up for carrying purposes, with a view to clearness and conciseness of description. Likewise, in the claims, the relations of the various elements will be stated in the same sense as in the description.

Figure 1:
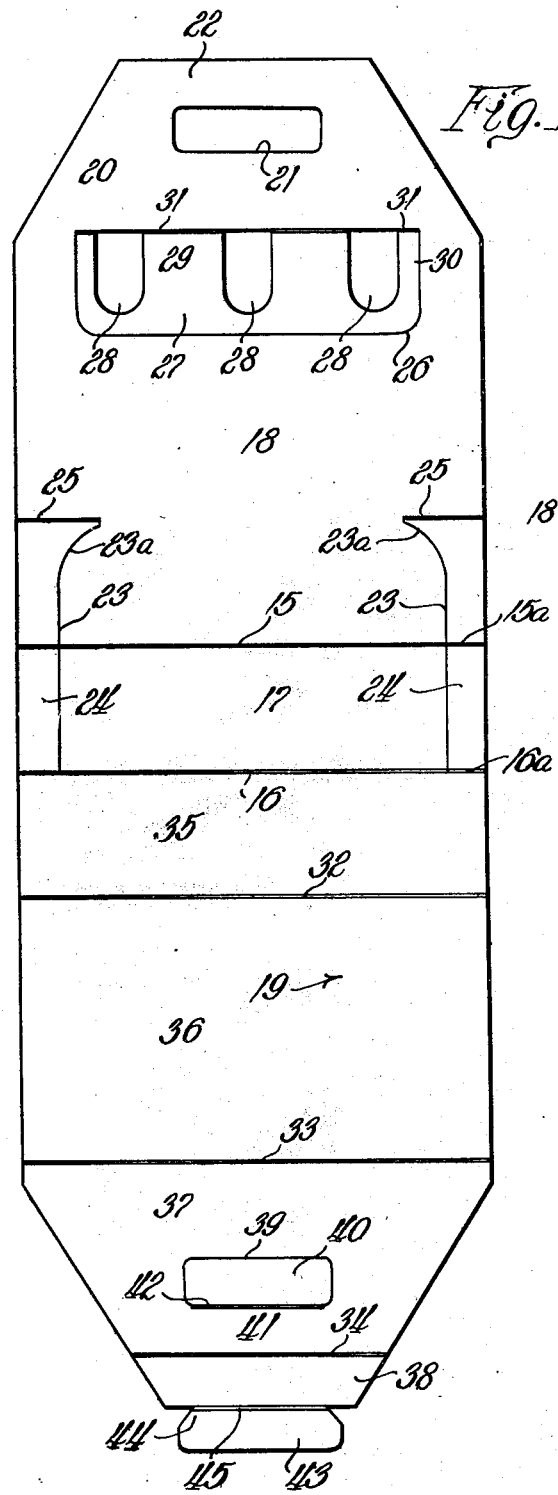
Figure 1 is a plan view of a blank from which the carrier of my invention is formed.
Figure 2:
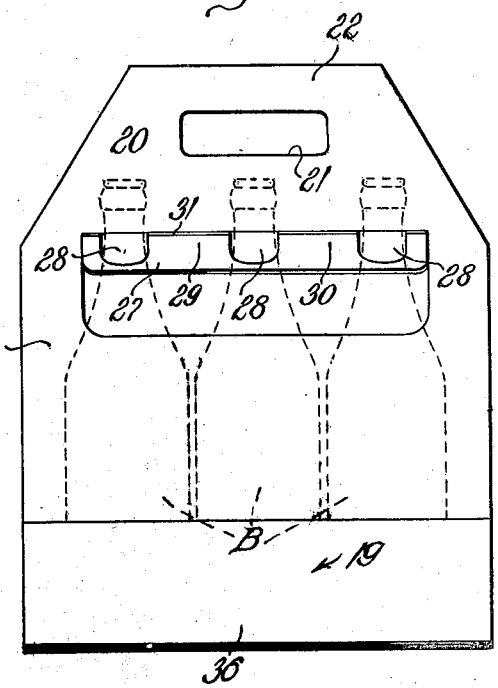
Figure 2 is a front view of the carrier as set up for display purposes.

The blank illustrated in Figure 1 may be formed of boxboard, cardboard, or any other suitable material. In the embodiment illustrated, by way of example, it is formed of cardboard and is provided, at its midportion, with two parallel spaced lines of scoring 15 and 16 dividing the blank into a bottom wall member 17 and back and front members 18 and 19, respectively, integrally connected at their lower edges to the back and front edges, respectively, of the bottom wall member 17.

The upper portion of back member 18 tapers upward providing a carrying flap 20 having a rectangular opening 21 and, above this opening, a handle element 22. Back member 18 and bottom wall member 17 are provided, a short distance inward from each end thereof, with a slit or cut 23 extending from the front edge of bottom wall member 17 across the latter and upward along back member 18 a suitable distance, preferably a distance equal to the width of bottom wall member 17. That provides, at each end of the blank, a strip 24 integrally connected at its forward edge to the front member 19 and at its rearward edge to the back member 18. The upper portion of the cut 23 preferably is of arcuate shape, as at 23ª, the rearward portion of the strip 24, which is the upper portion thereof shown in Figure 1, having its inner edge of corresponding curvature. The lines of scoring 15 and 16 are extended across the strip 24 at 15ª and 16ª, and back member 18 is provided with lines of scoring 25 extending across the rearward edges of strips 24, at the juncture thereof with back member 18. The latter member is further provided, at its upper portion, with a rectangular cutout or opening 26 defining a rectangular neck-retaining tab 27, provided with spaced bottle neck receiving apertures 28 and intermediate and end connecting elements 29 and 30, which elements are integrally connected at their rearward edges to the carrying flap 20. Lines of scoring 31 extend across elements 29 and 30, at the juncture thereof with flap 20, the lines of scoring providing folding lines for folding tab 27 upward and inward relative to back member 18.

Front member 19 is provided with spaced lines of scoring 32, 33 and 34, parallel with the line of scoring 16, dividing the front member into a lower front wall element 35, and intermediate panel 36, a carrying flap 37 and a locking flap 38. Carrying flap 37 is provided with a rectangular cutout or opening 39 defining a holding tab 40 integrally connected, at its upper edge, to handle element 41 of flap 37, there being a folding score line 42 extending along the upper edge of tab 40 at the juncture thereof with handle element 41. Tab 40 corresponds in length to opening 21, through which it may project under certain conditions, as will appear presently. A substantially rectangular locking tab 43 is integrally connected, at its rearward edge, to the lower edge of locking flap 38, by a neck element 44 tapering rearward in length as shown, there being a fold line of scoring 45 extending along the base of neck element 44. The body portion of locking tab 43 is of greater length than opening 21, through which tab 43 may be inserted by relative transverse movement of the back and front members 18 and 19, as will be explained more fully later.

The blank of Figure 1 may be shipped, if desired, in the condition shown in that figure, to the user, who may secure together proper elements of the blank and set it up for use. Preferably, however, the proper elements of the blank are secured together and the latter is then shipped to the user, who may then set the blank up for use with expedition and facility. The blank is folded into flat condition, with front wall member 35 overlying bottom wall member 17 and the corresponding portions of connecting strips 24, and the remainder of front member 19 overlying back member 18, tab 27 remaining within opening 26 and tab 40 remaining within opening 39, with the locking tab 43 extending from the lower edge of locking flap 38. While the blank is thus folded flat, the portions of connecting strips 24 between fold lines 15a and 16a thereof, are secured to front wall member 35, at the inner face of the latter, in a suitable manner, conveniently by means of metal staples 46, shown in Figure 3. The blank is then shipped to the user, in its folded flat condition.

Figure 3:
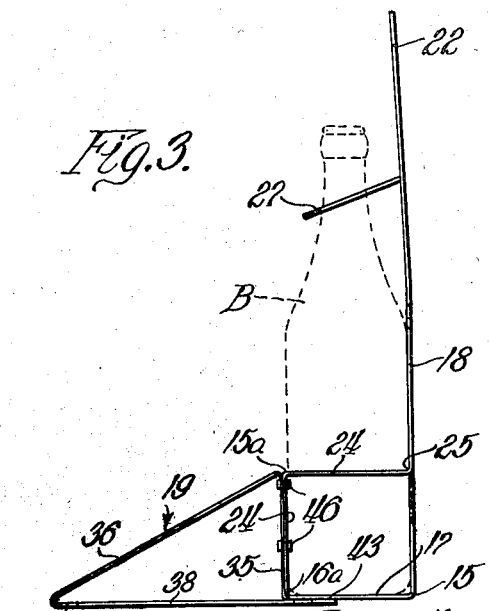
Figure 3 is an end view of the carrier as set up in Figure 2.

In setting up the blank, to form the carrier for display purposes, as in Figure 3, the portion of front member 19 above the score line 32 is folded forward or outward along that line, the back member 18 is held down and the front wall member 35 is moved forward and upward, folding the bottom wall member 17 about score line 15 into position extending forward from the lower edge of back member 18, and at the same time folding front wall member 35 into vertical position extending upward from the front edge of back wall member 17, this also causing folding of the connecting strips 24 about the fold lines 25 and 15a so that the portions of these strips between those lines extend horizontally above the ends of bottom wall 17. That produces a trough-shaped or sling-like structure suitable for reception of the lower portions of bottles or like containers, this sling-like body being closed at its ends by the connecting strips 24, which effectively prevent displacement of the bottles from the body of the carrier through the ends thereof. The strips 24 also provide effective bracing connections between the back member 18 and front wall member 35, which prevents objectionable spreading apart of these wall members. In addition, the portions of the strips 24 folded upon and secured to the front wall member 35, at the ends thereof, impart desirable rigidity and reenforcement to this latter member. After the carrier has thus been set up the containers or bottles B may be placed in the box-like body thus provided. Before placing the bottles in the body of the carrier, the tab 27 is bent forward and upward into position not to interfere with placing of the bottles, and after all of the bottles have been placed in the carrier the tab 27 is moved downward into substantially the position shown in Figures 2 and 3, with the bottle necks extending upward through the apertures 28. Tab 27 and the connecting strips 24 thus cooperate to prevent any of the bottles or containers from being displaced or dropped from the carrier.

After the carrier has been set up and the bottles have been positioned therein, in the above manner, carrying flap 37 may be bent rearward and upward beneath panel 19 and locking flap 38, together with the locking tab 43, may be inserted beneath the bottom wall member 17, being held in position by the weight of the contents of the carrier. Panel 19 is then disposed at a forward and downward inclination to the box-like body, with the inner face of this panel, which may bear suitable advertising matter, exposed to best advantage. The carrier then provides an effective counter display container which is also well suited for transporting the goods thus displayed.

Figure 8:
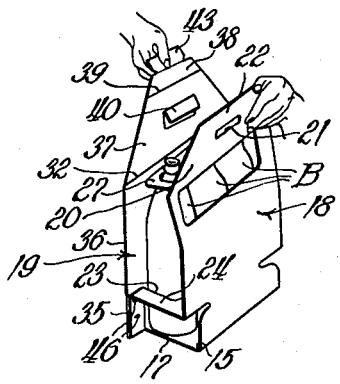
Figure 9:
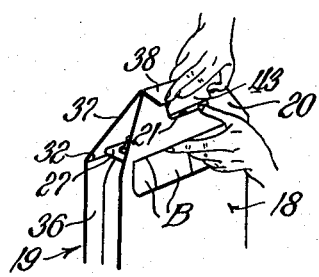
Figure 10:
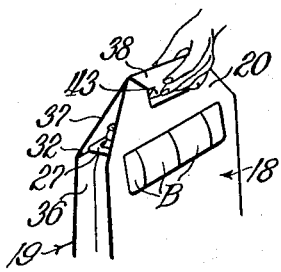
Figure 11:
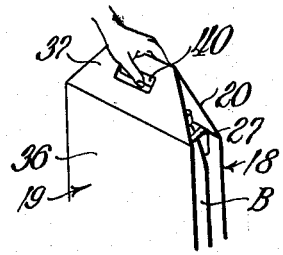

When it is desired to use the carrier for carrying purposes, the front member 19, above the fold line 32, is swung upward into the position shown in Figure 5, the upper edge of the carrying flap 37 being then disposed at the upper edge of carrying flap 20 of back member 18, locking flap 38 is turned downward and rearward about fold line 34, over the handle element 22 of carrying flap 20, locking tab 43 is inserted through opening 21 and is then bent inward and forward about folding line 45 into substantialy horizontal position, and folding tab 40 is then bent rearward and upward about folding line 42 into horizontal position underlying the locking tab 43. The manner in which the locking tab and the folding tab are moved into the positions referred to is shown more clearly in Figures 8 to 12, inclusive. In Figure 8 the carrying flap 20 of back member 18 and the locking tab 43 are grasped, as shown, and are moved toward each other so as to bring the upper edges of the flap 20 and flap 37 in contact, at the folding line 34, after which the locking flap 38 is folded downward and rearward over handle element 22, and one end of the locking tab 43 is inserted through opening 21 by relative transverse movement of the back and front members 18 and 19, as shown in Figure 9, the other end portion of locking tab 43 being then inserted through opening 21 by relative movement of tab 43 transversely of handle element 22, this completing the initial insertion of the locking tab 43 through opening 21. After that has been done tab 43 is folded upward and forward in the substantial horizontal position, in the manner indicated in Figure 10, and tab 40 is then folded upward and rearward into substantially horizontal position, in the manner indicated in Figure 11, thus completing the handle structure which may be grasped for transporting the carrier, as indicated in Figure 12. Referring to Figure 13, the handle structure thus produced is of triangular cross-section, the base thereof comprising the superposed tabs 40 and 43, and provides a handle which may readily be grasped and fits comfortably into the hand. Due to the triangular section referred to, this handle possesses considerable mechanical strength well able to support the load of the contents of the carrier without breakage or distortion of the handle. The front and the back members of the carrier are thus effectively locked together, when it is used for transporting articles, and, since the elements of the carrier which are subjected to load are under tension, the carrier may be formed of light material while possessing adequate strength for the purposes intended. Due to the manner in which the elements of the carrier are secured together, it may be used a number of times without loosing its shape or effectiveness, which is desirable for many reasons.

The carrier shown in Figures 2 to 5, inclusive, is intended for reception of three quart-size bottles. It will be understood, however, that the carrier may be made of a size to receive any desired number of bottles, within limits, of any desired capacity. The modified form of carrier shown in Figures 6 and 7 is intended for reception of six relatively small bottles arranged in a single row. This carrier is formed from the blank shown in Figure 6. The latter blank is, in general, similar to the blank of Figure 1 though of somewhat different shape. It comprises a bottom wall member 17a, front and back members 18a and 19a, respectively, the former being provided with opening 21a and handle element 22a at the upper portion of carrying flap 20a, and back member 18a and bottom wall member 17a being provided with suitable cuts or slits 23b the upper portions 23c of which are of arcuate shape, these cuts providing the end connecting strips 24a at the upper or rearward ends of which are provided the folding score line 25a. Lines of scoring 15b and 16b define the rear and front edges of bottom wall member 17a, these scorings extending across the strips 24a at 15c and 16c, respectively. Front member 19a is provided with lines of scoring 32a, 33a and 34a, separating it into front wall member 35a, panel 36a, carrying flap 37a and locking flap 38a, from which extends locking tab 43a having a reduced tapered neck 44a and provided with a line of scoring 45a, at its juncture with the locking flap 38a. Carrying flap 37a is provided with a cut or opening 39a defining a holding tab 40a connected at its upper edge to handle element 41a and there provided with a line of scoring 42a. Back member 18a is provided, adjacent each end thereof and below carrying flap 20a, with a U-shaped cut 26a defining a stirrup-shaped bottle neck receiving tab 27a having an aperture 28a, the arms of this tab being integrally connected at their upper ends to flap 20a and there provided with folding scores 31a. The blank of Figure 6 is folded, with the portions of connecting strips 24a between the folds 15c and 16c folded against the inner face of front wall member 35a and secured thereto, in the manner previously explained with reference to the blank of Figure 1, after which the blank of Figure 6 is shipped in its flat folded condition. This blank is set up in the same manner as the blank of Figure 1, to produce the carrier shown in plan in Figure 7. The bottles B¹ are then placed in the body of the carrier, with the holding tabs 27a disposed about the neck of the two end bottles. Since the two end bottles are effectively confined within the carrier, they are effective to prevent displacement of the remaining bottles in the carrier. For display purposes the carrying flap 37a and locking flap 38a are turned upward and rearward beneath panel 36a, with the locking flap 38a and locking tab 43a disposed beneath the bottom of the carrier body and panel 36a inclined downward and forward therefrom, in the same manner as in Figure 3. When it is desired to use the carrier for transporting the contents thereof, the front member 19a is moved into position extending upward from the forward edge of bottom wall member 17a, and is secured to the handle element in carrying flap 20a of back member 19a, in the same manner as these parts are locked together in the carrier shown in Figures 2 to 5, inclusive. This provides a handle structure of triangular cross-section which possesses adequate mechanical strength and is well suited for transporting the carrier, in the manner above described.

In certain cases it may be desirable to have the width of the carrier correspond to the total width of the bottles or containers therein. I contemplate, therefore, within the broader aspects of my invention, omitting the connecting strips 24 or 24a, with corresponding reduction in width of the carrier, and providing any suitable means for restraining the lower portions of the bottles against movement through the sides of the carrier. The carrier, with the connecting strips omitted, is still highly efficient for display and carrying purposes.

It will be understood, as above indicated, that changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. A one piece carrier comprising front and back members connected at their lower edges by a bottom wall member, and strips cut from said back and bottom wall members integral with and extending between said front and back members at the ends thereof and folded upon and secured to said front member at the inner face thereof, said strips defining with said bottom wall member and the lower portions of said front and back members a box-like body closed at its ends by said strips, said front and back members extending upward from said body and being provided with handle elements at their upper portions.

2. A one piece carrier comprising front and back members connected at their lower edges by a bottom wall member, and strips cut from said back and bottom wall members integral with and extending between said front and back members at the ends thereof and folded upon and secured to said front member at the inner face thereof, said strips defining with said bottom wall member and the lower portions of said front and back members a box-like body closed at its ends by said strips, said front member comprising a display panel foldable downward and outward along a line above and parallel with the front wall of said body, a carrying flap extending from the upper edge of said panel, and a locking flap extending from the upper edge of said carrying flap, said flaps being foldable toward the outer face of said panel into position beneath the same with said locking flap extending beneath the bottom wall of said body, when said panel is folded into position inclined downward and forward from said body with its inner face exposed, said back member extending upward from said body and being provided at its upper portion with a handle element cooperating with said flaps in the use of the carrier for carrying purposes.

3. A one piece carrier comprising front and back members connected at their lower edges by a bottom wall member, and strips cut from said back and bottom wall members integral with and extending between said front and back members at the ends thereof and folded upon and secured to said front member at the inner face thereof, said strips defining with said bottom wall member and the lower portions of said front and back members a box-like body closed at its ends by said strips, said front member being provided with spaced lines of fold parallel with the upper edge of the front wall of said body defining a display panel, a carrying flap extending from the upper edge of said panel, and a locking flap extending from the upper edge of said carrying flap, said back member extending upward from said body and being provided at its upper portion with a handle element cooperating with said flaps.

4. A one piece bottle carrier comprising front and back members connected at their lower edges by a bottom wall member, strips cut from said back and bottom wall members integral with and extending between said front and back members at the ends thereof and folded upon and secured to said front member at the inner face thereof, said strips defining with said bottom wall member and the lower portions of said front and back members a box-like body closed at its ends by said strips, said front and back members extending upward from said body and being provided with handle elements at their upper portions, and apertured bottle neck receiving tab means cut from one of said front and back members and bent inward and upward therefrom 5. A one piece bottle carrier comprising front and back members connected at their lower edges by a bottom wall member, strips cut from said back and bottom wall members integral with and extending between said front and back members at the ends thereof and folded upon and secured to said front member at the inner face thereof, said strips defining with said bottom wall member and the lower portions of said front and back members a box-like body closed at its ends by said strips, said front and back members extending upward from said body and being provided with handle elements at their upper portions, and an apertured bottle neck receiving tab cut from said back member and bent inward and upward therefrom.

6. A blank foldable into carrier form, said blank comprising a single piece of material provided with parallel transverse scores for folding, defining a bottom wall member and front and back members foldable into positions extending upward from the front and back edges of said bottom wall member, the latter and said back member being cut adjacent their ends providing connecting strips each integrally connected at its front edge to the lower edge of said front member and at its rear edge to said back member.

7. A blank foldable into carrier form, said blank comprising a single piece of material provided with parallel transverse scores for folding, defining a bottom wall member and front and back members foldable into positions extending upward from the front and back edges of said bottom wall member, the latter and said back member being cut adjacent their ends providing connecting strips each integrally connected at its front edge to the lower edge of said front member and at its rear edge to said back member, said front member being provided with parallel transverse scores for folding, defining a body front wall member, a display panel extending from the upper edge of said front wall member and a carrying flap extending from the upper edge of said panel.

8. A blank foldable into carrier form, said blank comprising a single piece of material provided with parallel transverse scores for folding, defining a bottom wall member and front and back members foldable into positions extending upward from the front and back edges of said bottom wall member, the latter and said back member being cut adjacent their ends providing connecting strips each integrally connected at its front edge to the lower edge of said front member and at its rear edge to said back member, said front member being provided with parallel transverse scores for folding, defining a body front wall member, a display panel extending from the upper edge of said front wall member, a carrying flap extending from the upper edge of said panel and a locking flap extending from the upper edge of said carrying flap, said back member being provided at its upper portion with a handle element cooperating with said flaps.

9. A carrier comprising upwardly converging front and back members, one provided with an opening and the other with a holding tab integral therewith, said other member being further provided with an integral locking flap folded over the upper edge portion of said one member having an integral locking tab inserted through said opening and bent into substantially horizontal position, said holding tab being bent into substantially horizontal position in juxtaposed relation to said locking tab, said tabs and the upwardly converging upper portions of said front and back members together defining a handle structure of triangular cross-section the base of which is formed by said tabs.

10. A carrier comprising upwardly converging front and back members, one provided with an opening and the other with an integral holding tab, said other member being provided with an integral locking flap foldable over the upper edge portion of said one member, said flap being provided with an integral locking tab of greater length than said opening connected to said flap by a reduced neck and insertible through said opening by relative transverse movement of said members, said locking tab being bendable upward into substantially horizontal position, after insertion thereof through said opening, said holding tab being bendable upward into substantially horizontal position in juxtaposed relation to said locking tab.

11. A one piece carrier comprising front and back members connected at their lower edges by a bottom wall member with intervening fold lines, the latter member and the lower portions of said front and back members, when said lower portions are folded into positions substantially perpendicular to said bottom wall member, defining a sling-like body, said front member being provided with spaced lines of fold parallel with the upper edge of the front wall of said body defining a display panel, a carrying flap extending from the upper edge of said panel, and a locking flap extending from the upper edge of said carrying flap, said flaps being foldable toward the outer face of said panel into position beneath the same with said locking flap extending beneath the bottom wall of said body, when said panel is folded into position inclined downward and forward from said body with its inner face exposed, said back member extending upward from said body and being provided at its upper portion with a handle element cooperating with said flaps in the use of the carrier for carrying purposes.

DONALD PAYNE WHEELER.